(12) United States Patent
Zhang et al.

(10) Patent No.: US 10,255,277 B2
(45) Date of Patent: Apr. 9, 2019

(54) CROWD MATCHING TRANSLATORS

(71) Applicant: Facebook, Inc., Menlo Park, CA (US)

(72) Inventors: Ying Zhang, Palo Alto, CA (US);
Aram Grigoryan, San Ramon, NJ (US)

(73) Assignee: FACEBOOK, INC., Menlo Park, CA (US)

( * ) Notice: Subject to any disclaimer, the term of this patent is extended or adjusted under 35 U.S.C. 154(b) by 133 days.

(21) Appl. No.: 15/192,131

(22) Filed: Jun. 24, 2016

(65) Prior Publication Data
US 2017/0371869 A1 Dec. 28, 2017

(51) Int. Cl.
G06F 17/20 (2006.01)
G06F 17/28 (2006.01)
H04L 29/08 (2006.01)

(52) U.S. Cl.
CPC ...... G06F 17/2854 (2013.01); G06F 17/2836 (2013.01); H04L 67/22 (2013.01)

(58) Field of Classification Search
CPC ... G06F 17/2854; G06F 17/2836; H04L 67/22
USPC .............................. 704/2, 5, 7, 9
See application file for complete search history.

(56) References Cited

U.S. PATENT DOCUMENTS

2012/0240039 A1* 9/2012 Walker ............... G06F 17/2836
715/265
2014/0303956 A1* 10/2014 Wilson ................. G06Q 10/06
704/2

* cited by examiner

Primary Examiner — Thierry L Pham

(57) ABSTRACT

Exemplary embodiments relate to techniques for selecting translators willing to provide high-quality translations for a cause, organization, or individual. Users having a high level of engagement with the cause, organization, or individual may be identified as translator candidates. For example, the user may actively engage with the organization or individual on social media, or may be interested in the topics discussed in the source document. The translators may be evaluated based on the quality of their previous translations and their level of engagement/interest. The translator candidates may be directly connected with the originator of the request to translate the document. Because exemplary embodiments select highly engaged users to translate the source document, the resulting translation is likely to be of higher quality, and produced at a lower cost, than a translation by a non-engaged user, and user participation and awareness of a cause, organization, or individual may be increased.

20 Claims, 9 Drawing Sheets

CROWD MATCHING TRANSLATORS

BACKGROUND

Translations of material from a source language into a destination language are widely used in a globalized economy. If a business or organization wishes to reach a large number of people, particularly when communicating through the global Internet, the business or organization may need to provide materials in many different languages. However, such translations may be expensive to produce. For example, a professional translation service may charge about seven cents per word in order to translate a document The cost of providing translations is particularly concerning for charitable organizations and causes. Such groups may need to rely on lower-cost and lower-quality translation services, or automatic machine translations.

Furthermore, when creating a translation for a business or charitable cause, the original source document will often include highly specific or technical language (e.g., technological terms, medical phraseology, very specific brand information or trademarks, etc.). A general-purpose translation service may not be capable of accurately translating this language in all cases, while special-purpose translation services specializing in translations of these types may be correspondingly more expensive.

SUMMARY

The present application is related to techniques for crowd-sourcing translations in order to provide high-quality translations for causes with which the translators are highly engaged. According to exemplary embodiments, upon receiving a request to translate a source document, a group of users capable of translating the source document may be identified. The source document may originate at, or be associated with, an individual, organization, business, or charitable cause. The group of users may be users of a social network.

The group of users may be evaluated to determine their level of interest in the individual, organization, business, or cause, and may also be evaluated based on their interest in the topics discussed in the source document. Based on these analyses, the users may be organized into groups, and optionally an engagement score may be calculated for each user. A first group may include users that are engaged with the organization or individual that originated the source document, and that are interested in the topics discussed in the source document. A second group may include users that have a general interest in the topics discussed, but may not have much contact with the originating organization or individual. A third group may include the general public.

Translators from the first group may be selected and a request to translate the document may be sent to the translators. If no members of the first group agree to translate the document, or if few or no users fall into the first group, users in the second group may be selected. Similarly, if users in the second group are not available, users in the third group may be selected.

In some embodiments, users who dislike the topics discussed in the source document, or the individual or organization that originated the source document, may serve as a fourth group and may be filtered out of consideration for translating the document.

The translator candidates may be directly connected with the originator of the request to translate the document, and may translate the document for the requestor. The translation may be evaluated for quality, and a reputation or score associated with the translator that generated the translation may be modified. The reputation or score of each translator may be presented to the originating requestor of the translation in order to allow the requestor to identify translators on whom they will rely. The requestor may also be presented with information about the user, such as the user's engagement score for this particular translation. If the user has opted to make information about their interests available, this information may also be shared with the requestor.

In some embodiments, users may agree to translate the document at no cost (e.g., because they strongly believe in or favor the organization or individual that originated the source document or the topics addressed in the source document). In some embodiments, the translators may be paid a fee for translating the document.

Because exemplary embodiments select highly engaged users to translate the source document, the resulting translation is likely to be of higher quality, and produced at a lower cost, than a translation by a non-engaged user. Moreover, the user may gain a sense of ownership or affiliation with the organization, individual, or cause for which the translation was made. This allows organizations and individuals to engage with their fans, which increases awareness of the organization or individual, and encourages participation in causes by members of the public.

These and other features and advantages will be described in more detail with reference to the attached drawings.

DETAILED DESCRIPTION

Exemplary embodiments relate to techniques for identifying translators capable of, and willing to, provide high quality translations for causes, individuals, or organizations with which the translators are highly engaged. If the candidate translators are highly engaged with the entity that originated the source document (or is associated with the source document), then the translators are more likely to be interested in that entity and to be familiar with terminology associated with that entity. Moreover, if the translators feel strongly positive about the originating entity or the topics discussed in the source document, that translators may wish to translate the document (even at a reduced or no cost) in order to promote the entity or cause, or to become affiliated with the entity. As a result, the originating entity may receive a low-cost, high-quality translation and may simultaneously engage with or encourage participation by that entity's admirers.

Figure 1A:
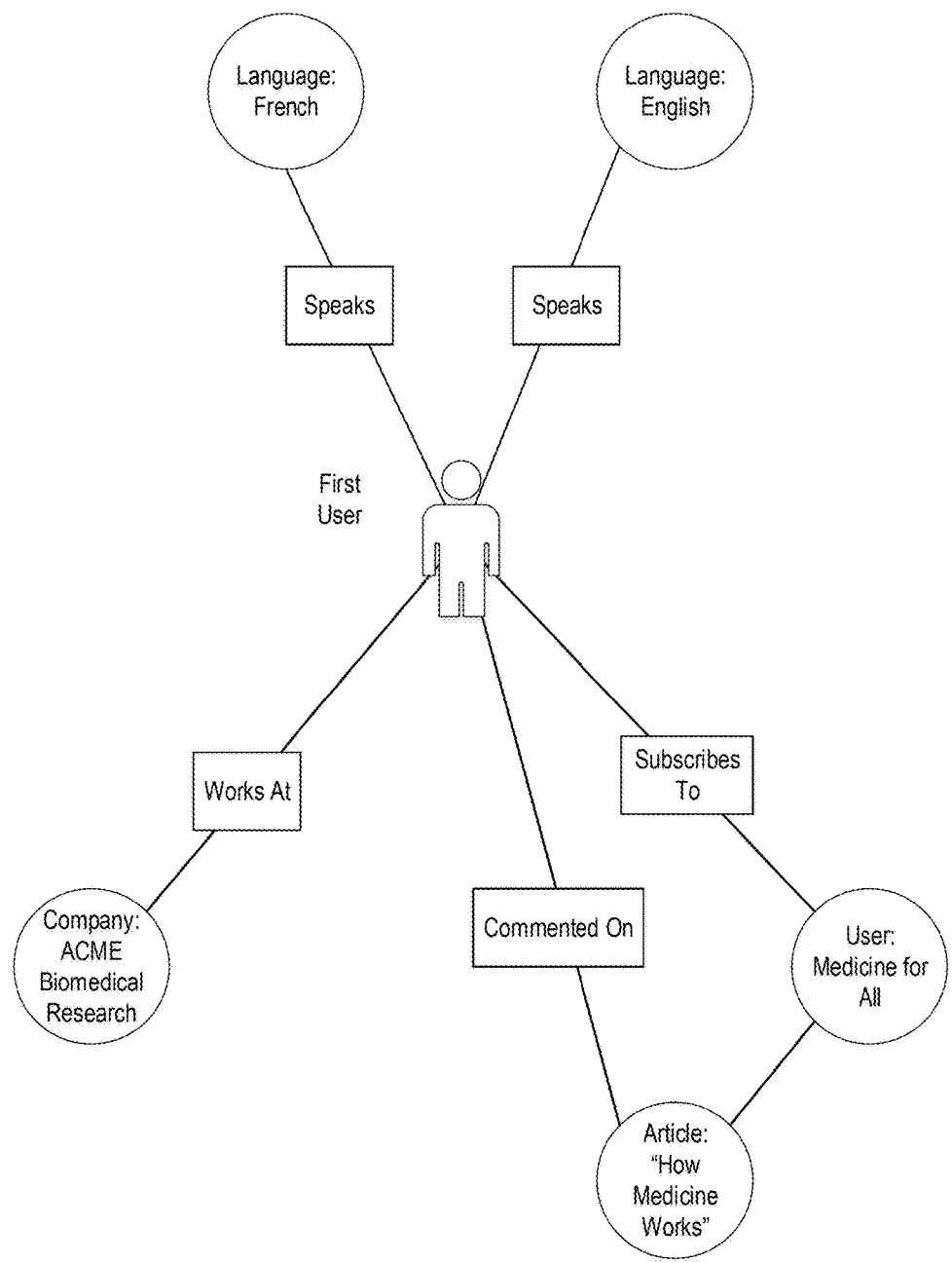
FIGS. 1A-1B provide two examples of translators who may be available to translate a source document.

By way of illustration, FIG. 1A depicts an example of a first user having a number of interests and characteristics. For example, the first user speaks both French and English, works at the ACME Biomedical Research Company, and subscribes to the social networking page of the organization "Medicine for All." Medicine for All, in this case, represents a charitable organization dedicated to providing medical treatment to the poor. In the example of FIG. 1A, Medicine for All recently published an article entitled "How Medicine Works," and the first user commented on the article.

Assume that Medicine for All wishes to have the "How Medicine Works" article translated into French. Several indications in FIG. 1A show that the first user may be a good candidate for translating the document. In addition to having the required language proficiencies (the first user speaks both English and French), the first user works in a related industry and is a subscriber to Medicine for All's social network page. Furthermore, the first user actively engages with Medicine for All's social network page, having recently commented on one of Medicine for all's articles.

These factors suggest that the first user may be a particularly good candidate for translating the article. The first user is not only interested in the topic of medicine in general, but has specifically engaged with the entity that originated the article (Medicine for All).

Figure 1B:
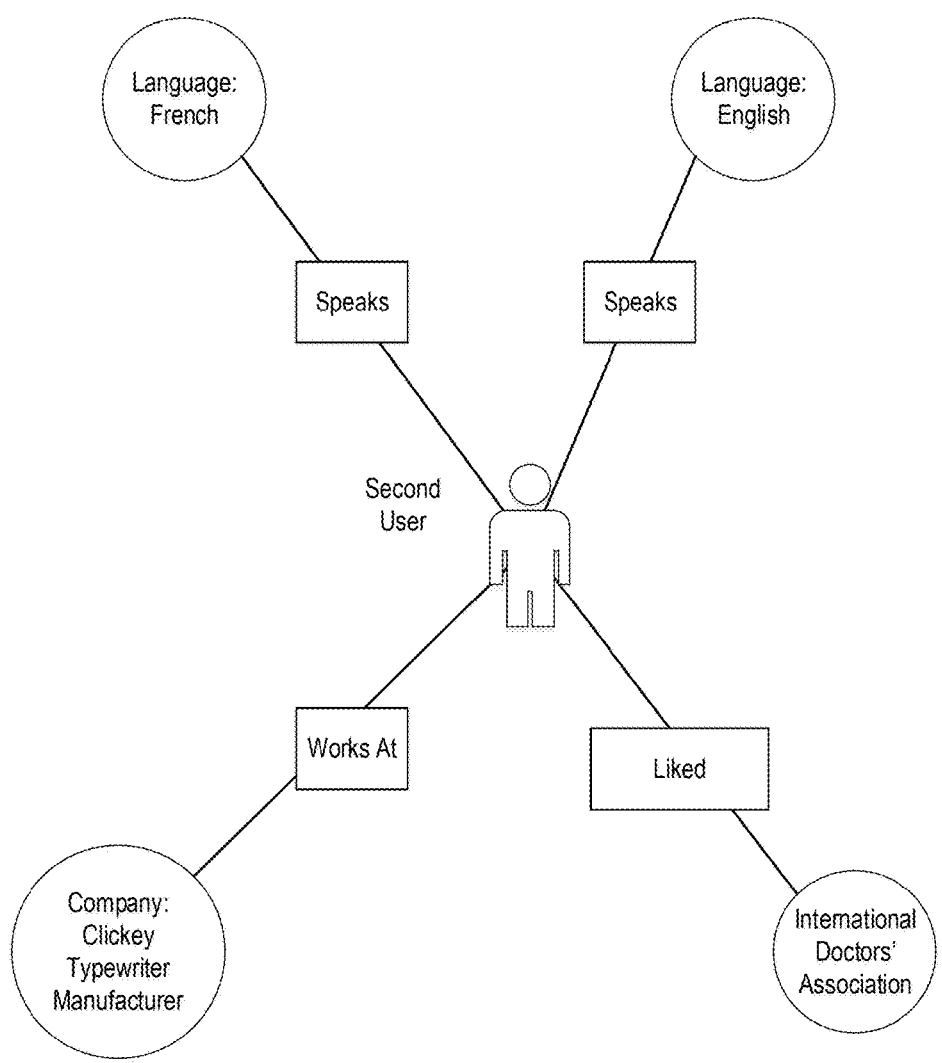

FIG. 1B depicts an example of another user that may be eligible to translate the article. In this case, the second user also speaks English and French. The second user works at Clickey Typewriter Company, and is therefore not employed in the medical industry, and furthermore is not a follower of Medicine for All. Nonetheless, the second user did recently "like" the page of the International Doctor's Association on a social network, indicating that the second user probably has some interest in medicine.

Thus, the first user is probably the preferable translator because of their higher engagement with medicine in general and the entity Medicine for All specifically. The second user is still probably a good candidate, because the second user appears to have an interest in medicine. Thus, the second user would probably be a better candidate than a member of the general public without a particular interest in medicine.

Figure 2:
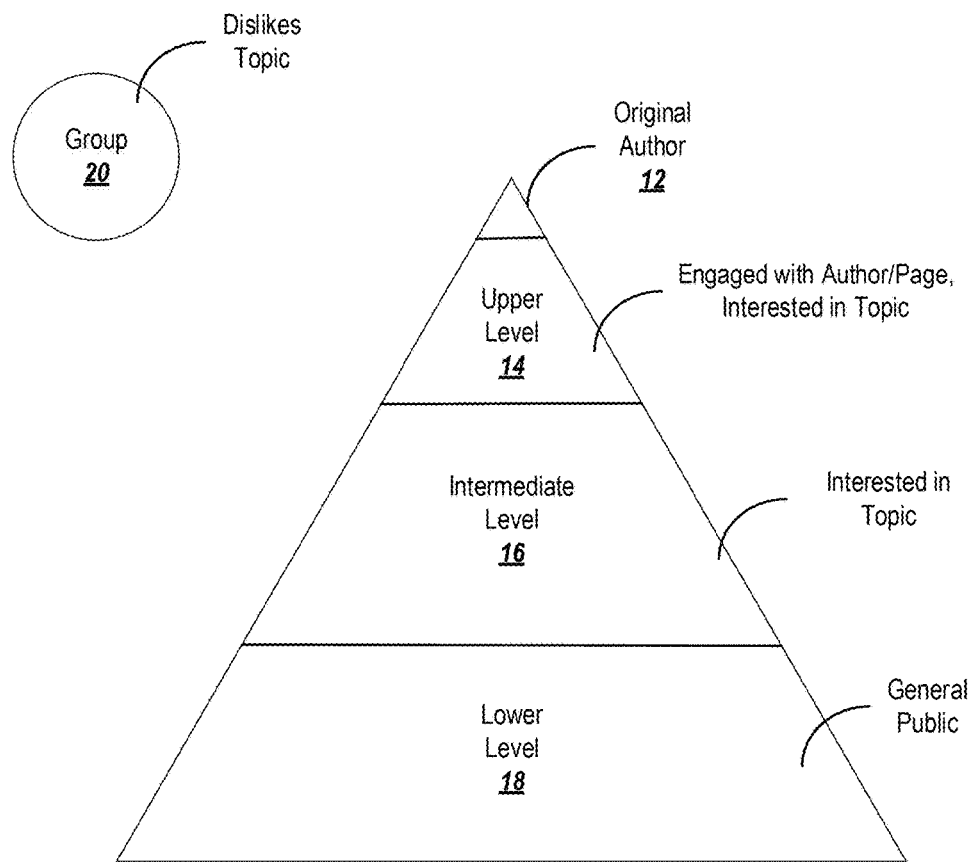
FIG. 2 depicts an exemplary hierarchy of translators that may be selected to translate a source document.

With these examples in mind, FIG. 2 shows a hierarchy 10 that organizes users according to their level of engagement with an entity and/or interest in a topic.

At the top of the hierarchy is the original author 12 of the source document, or the entity itself. Below this level is an upper level 14 of people who are engaged with the author, the entity, or a social network's page associated with the author or entity. Such people are likely to have a high level of interest in the source document, and furthermore are likely interested in seeing the author or entity 12 succeed in their goals.

Below the upper level 14 of people is an intermediate level 14 including people who are interested in the general topics that are addressed by the author or entity 12, or that are discussed in the source document. Such people are likely to understand the terminology and language patterns used in the source document, and probably have positive feelings toward the author or entity 12 (or would, if they were made aware of the author or entity 12).

Below the intermediate level 16 is a lower level 18 that includes the general public. The lower level 18 includes users that have not expressed any particular interest in the author or entity 12 or the topics of the source document. Although the lower level 18 may include translators who could translate the source document, these translators are likely to be less interested in seeing the author or entity 12 succeed, and may not have the same language skills in the specific fields addressed in the source document as compared to users at higher levels of the hierarchy 10.

A fourth group 20 may also be considered. This group 20 includes users who actively dislike the topic under discussion, or are committed to an opposing viewpoint. This group 20 may be filtered out of translation candidates and the system may refrain from offering translation tasks to the group 20 pertaining to entities or topics that the group 20 dislikes. For example, if the original author 12 is a food scientist writing an article about the positive health effects of bananas, then the group 20 might include members of the organization "Bananas are Bad for You."

Exemplary embodiments discussed in more detail below are directed to techniques for identifying users in the upper level 14 an the intermediate level 16 of the hierarchy, and offering translation tasks to these users before resorting to members of the lower level 18. Before describing these techniques in detail, a general note on data privacy is provided.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Next, an overview choosing translators that are well-suited to translating particular source documents is provided.

Translator Information

Figure 3:
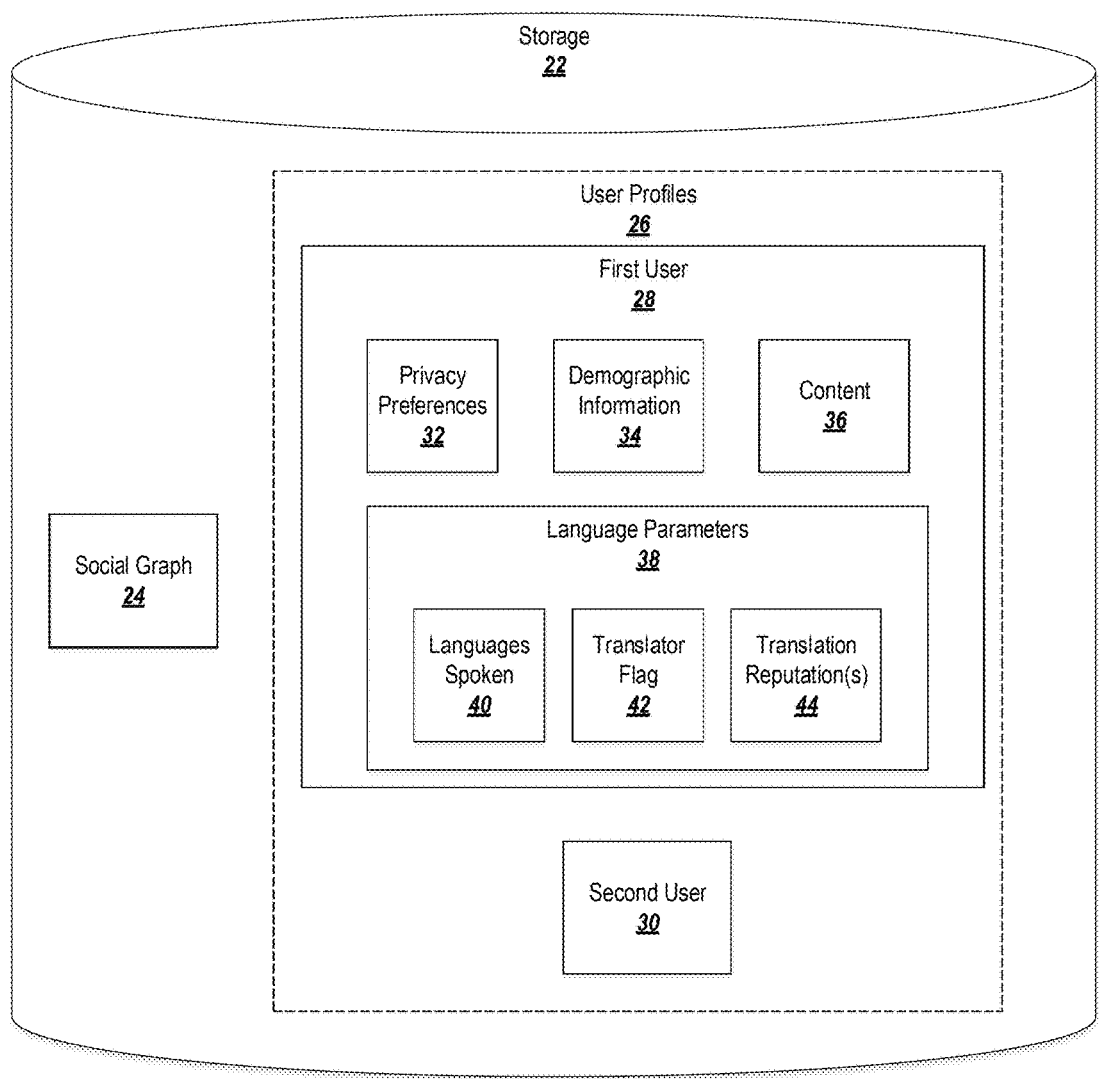
FIG. 3 is a block diagram depicting exemplary representations of translator information suitable for use with exemplary embodiments.

FIG. 3 depicts an example of a storage system 22 storing user information.

The storage system 22 may be, for example, a storage system for storing information for use in a social network. To that end, the storage system 22 may store a social graph 24 and user profiles 26. The social graph 24 indicates how users are connected to each other and to other concepts, documents, etc. Social graphs 24 are described in more detail in connection with FIG. 7, below.

The user profiles 26 may include settings, parameters, preferences, and other information for users of the social network, including (e.g.) a first user 28 and a second user 30. Each user may be associated with multiple pieces of information, only a few that are particularly relevant of which are shown for brevity.

The user profile may include privacy preferences 32. The privacy preferences 32 may include a general privacy setting (e.g., "low," "medium," "high," etc.) which is interpretable by a social networking service to apply a predetermined set of privacy allowances. The privacy preferences 32 may also include settings indicating what information of the user 28 is allowed to be shared, who is allowed to access shared information, and how long the information may be shared for. The privacy settings 32 may include a list of uses that the information is allowed to be used for (e.g., experimental uses, job inquiries, etc.).

The user profile may also be associated with demographic information 34, providing information about the age, gender, interests, etc. of the user 28. Content 36 or a link to content that the user uploads to the social network may be stored in the user profile, or elsewhere in the storage 22. The demographic information 34 and the content 36 may be analyzed to identify the user's interests and affinities, and may be used to determine whether the user would be well-suited to translating a given source document.

The user profile may also include language parameters 38 indicating the user's proficiencies with various languages and the user's willingness to serve as a translator. For example, the language parameters 38 may include a list 40 of languages that the user is proficient in, and a self-assessed level of proficiency (e.g., "conversational," "fluent," etc.) in each language.

The parameters 38 may also include a translator flag 42, indicating whether the user 28 is willing to serve as a translator. The user may set one translator flag 42, indicating that the user is willing to serve as a translator between any pair of languages in the language list 40, or may set separate translator flags 42 for different languages or pairs of languages.

The parameters 38 may further include a translation reputation 44, which represents a second- or third-party assessment of the quality of the user's translations. The translation reputation 44 may be generated based on ratings from entities for which the user has performed translation, based on automatic analyses of the user's translations, or based on indirect measurements of the users translations. The translation reputation 44 is discussed in more detail in connection with FIG. 5.

Figure 4:
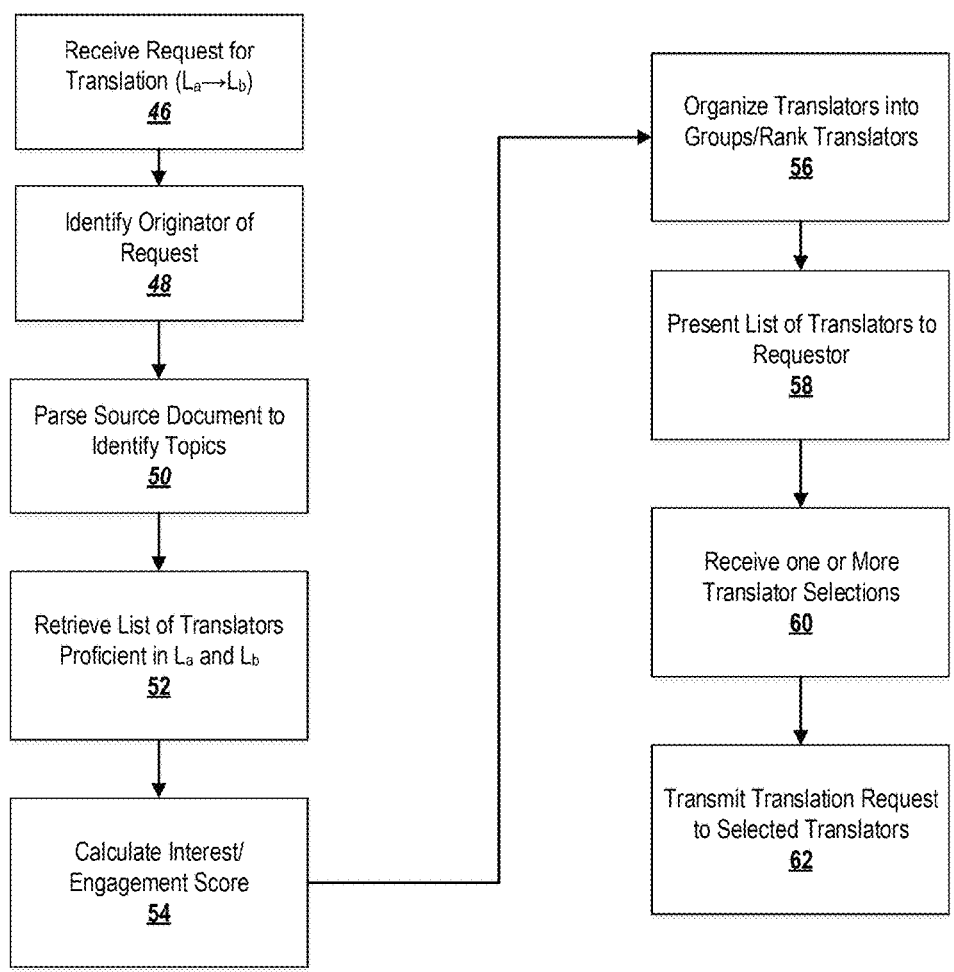
FIG. 4 is a flowchart describing an exemplary process for identifying translators for translating a source document.

The information in the user profiles 26 may be used to select translators for specific tasks. FIG. 4 provides an overview of a process for selecting translators.

Choosing Translators

The exemplary procedure for requesting the translation of source material and selecting candidate translators illustrated in FIG. 4 begins at step 46, when a system (e.g., a translation system or a social networking system) receives a request to translate a source document from a source language ($L_a$) into a destination language ($L_b$). The request may be submitted by a requestor, and may be associated with an entity such as an organization (such as a company, charitable organization, rock band, etc.) or an individual (such as an activist, celebrity, etc.). At step 48, the system may identify the requestor and/or any entities associated with the request or source document. This information may be provided as part of the request, may be automatically determined based on network information identifying the sender of the request, may be found in the source document, or may be determined in other ways.

In some circumstances, the request may indicate that the requestor is willing to pay a fee for the translation service. In this case, the fee amount may be considered in following steps. For example, users may specify that they are willing to serve as a translator, but only for a certain minimum fee amount. This information may be considered when selecting a list of candidate translators. Any fee offering may be communicated to the user at step 62.

At step 48, the system may also identify one or more topics associated with the requestor and/or the entity associated with the request. For example, if the entity promotes or participates in a cause in a particular field, or is associated with a certain activity or genre of activities, this information may be determined at step 48. This information may be determined by consulting a social network page or social graph associated with the requestor and/or the associated entity. The social network page or graph may identify concepts or keywords that are related to the requestor/entity, which may be retrieved at step 48.

At step 50, the system may parse the source document to identify topics addressed in the source document. For example, the system may perform a keyword analysis or other type of analysis on the source document to determine topics that have been discussed in the source document. Keywords or tags may also be provided in metadata associated with the source document, or could be specified as part of the request.

At step 52, the system may retrieve a list of translators proficient in the source language and the destination language. For example, the social network may create or maintain such a list based on the language parameters 38 that are part of each users' profile, assuming that the user has authorized that their information may be accessed.

At step 54, the system may calculate an interest or engagement score for each of the translators identified at step 52. The interest or engagement score may represent an affinity of the user for the topics identified at step 50 and/or the requestor or entity identified at step 48. Different scores may be calculated for topic interest and entity affinity (e.g., a user may have a high affinity for topics addressed in the source document, but may not be aware of the entity).

Calculating a score based on interests may involve comparing the topics identified at step 50 as well as activity or genre information identified at step 48 to the user's interests. The user's interests may be explicitly listed in the user's demographic information 34 or may be derived from the demographic information, may be inferred from the content 36 that the user is associated with, or may be determined based on connections in the social graph 24, among other possibilities. The user's interests as determined from these sources may be compared to the topics and activities from steps 48 and 50 to determine how closely they match.

Calculating a score based on engagement may involve determining how well-connected the user is to the requestor or entity in the social graph 24. For example, if the user is directly connected to the entity (e.g., the user "likes" the entity, comments on the entity's social network posts, or shares articles from the entity), then this information may be factored into an engagement score. The user also may be indirectly connected to the entity (e.g., the user and the entity share a common connection to another entity, or a significant number of the user's friends are engaged with the entity). In some cases, different types of engagement that reflect a higher level of affinity may be weighed more strongly than others. For example, if the user "likes" the entity's page, this may be counted less than if the user engages with the entity by commenting on the entity's posts.

The actions analyzed to calculate the interest or engagement score may involve positive and negative actions. For example, a user may comment on the entity's social network page, but the comment may include criticism of the entity. This may indicate that the user is engaged with the entity, but does not approve of the entity or the entity's causes. This information may be taken into account to raise or lower the score. If the interest/engagement score falls below a predetermined threshold, the user may be added to the group 20 of users that dislike the entity.

At step 56, the system may organize the translators for whom scores were calculated at step 54 into groups. For example, the translators may be arranged into a hierarchy such as the one shown in FIG. 2, in which an upper level of users has high scores for both engagement with the entity and interest in the associated topics, an intermediate level of users has a high score for topical interest but a low score for entity engagement, and a lower level of users has a low score for engagement and a low score for interest. The scores may be evaluated in view of one or more predetermined thresholds to determine whether the scores are high or low.

Alternatively or in addition, the candidate translators may be ranked with respect to each other. In some embodiments, the candidate translators may be ranked without arranging the translators into groups in a hierarchy. In other embodiments, the candidate translators may first be arranged into groups in the hierarchy and then ranked within their respective groups.

At step 58, the system may present a list of translators to the requestor. The list may include translators in the upper level of the hierarchy, or a predetermined number of translators having a relatively high rank (or a predetermined number of the highest-ranked translators in the upper level of the hierarchy). In some embodiments, if the users have authorized that their identities be shared, the requestor may be provided with an indication of the identity of the candidate translators. In other embodiments, the requestor may be presented with a generic identifier, such as an identification number, for the candidate translators.

Along with an identifier of the candidate translators, the requestor may be provided with information about the translators' interest in the topics discussed in the source document or associated with the entity/author, and/or may be provided with a history of the translator's engagement with the entity/author. This assumes, of course, that the user has authorized that this information be shared. In alternative embodiments, the interest and/or engagement scores of the users calculated at step 54 may be provided to the requestor, without providing specific information about the translators.

Using the list from step 58, the requestor may select one or more of the candidate translators to provide a translation. In some circumstances, the requestor may wish to specify more than one candidate translator in case one of the selected translators is unavailable or unwilling to translate the source document. In other circumstances, the requestor may desire more than one translation of the source document (e.g., to receive multiple translations in the hopes that one will be of particularly high quality, or to receive different translations from different demographic groups in the hopes of accommodating different language patterns of the different groups). At step 60, the system may receive the requestor's selections of translators.

At step 62, the system may transmit a translation request to the translators selected at step 60. The request may identify the requestor and/or entity/author associated with the source document, and may provide a copy of the source document. The request may indicate a requested timeline (e.g., a deadline) and any fee offered by the requestor. Alternatively or in addition, the system may create or facilitate a direct connection between the requestor and the translator. For example, the system may provide the translator with an indication that a request for translation has been received associated with the entity/author, and may provide contact information for the requestor so that the translator can contact the requestor directly (or vice versa, if the translator authorizes that their contact information be shared).

After the received document is translated and published, the translation may be flagged with an indication that the translation was prepared by the translator. This allows the translator to affiliate themselves with the entity that originated the source document and earn recognition for their efforts on behalf of the entity.

Once the translator agrees to translate the source document, the translation may be provided and evaluated for quality. The quality evaluation may be used to provide quality control and to provide the user with a reputation score that may be used by future requestors to determine whether to provide the translator with translation tasks. This process is discussed in more detail below.

Assessing Translations

Figure 5:
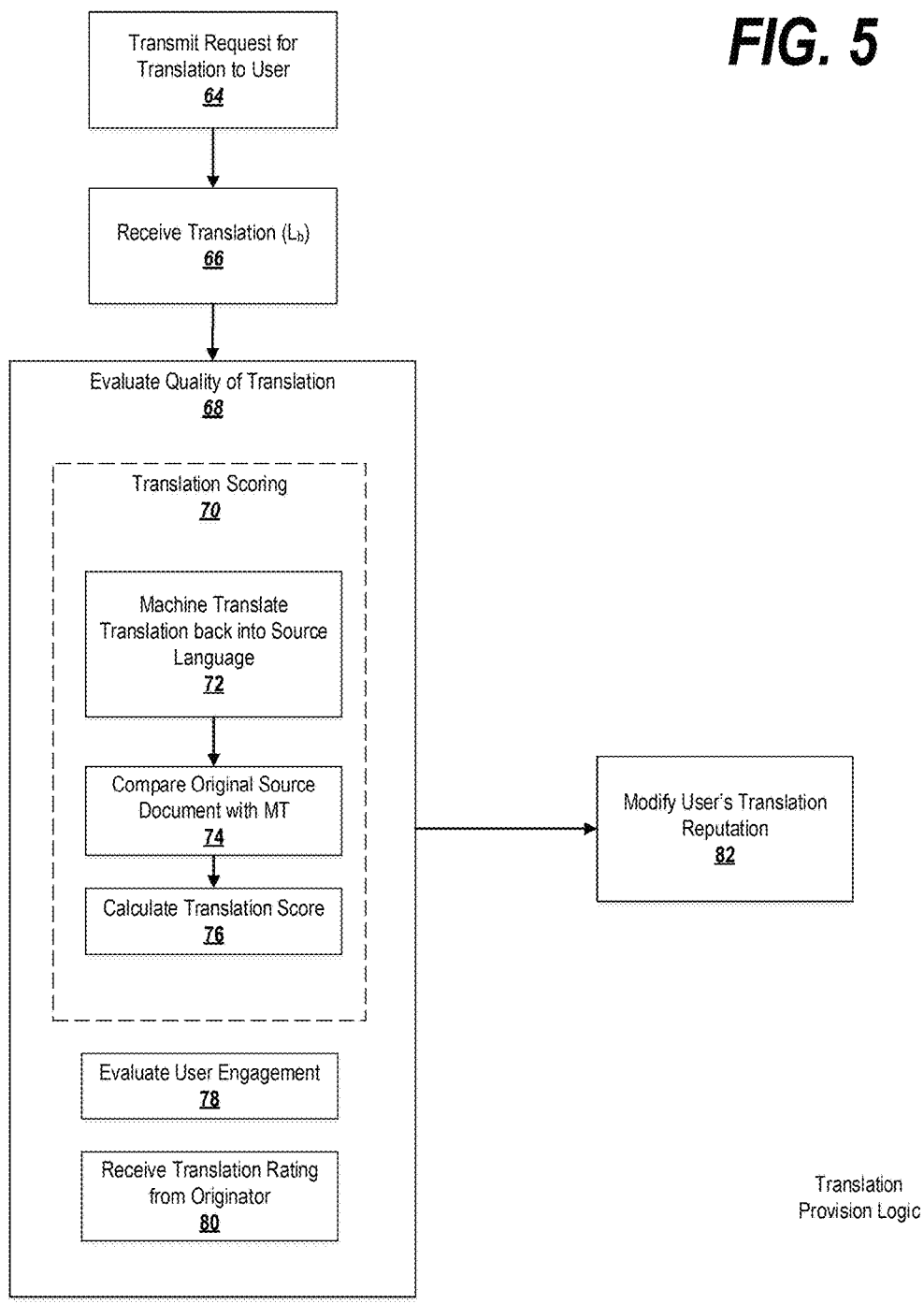
FIG. 5 is a flowchart describing an exemplary process for receiving and evaluating a translation.

FIG. 5 depicts an exemplary process for receiving and evaluating translations. The process beings at step 64, where the system transmits a request for translation to a user. Assuming that the user agrees to provide the translation, the translation may be received by the system at step 66.

At step 68, the translation may be evaluated for quality. There are many ways in which translation quality may be evaluated; a few are described below of illustration. One of these techniques may be used, or multiple techniques may be used in combination.

In one embodiment, a translation scoring process 70 is provided. In the translation scoring process 70, the translated destination-language document may be retranslated back into the original source language at step 72. For example, the translated document may be subjected to machine translation to return it to the source language.

At step 74, the retranslated document may be compared to the original source language document. If the retranslated document and the source document are the same or similar, this may indicate that the translation is a high quality translation. On the other hand, if the retranslated document and the source document differ substantially, this may indicate a low quality translation. Because it is possible to translate the same text in several different ways, step 74 may account for differences in translation preferences by retranslating the document several times using different models or translation systems.

Based on the similarities or differences identified at step 74, a translation score may be calculated at step 76. Examples of translation scores include the bilingual evaluation understudy (BLEU) score. The translation score 76 may allow for different translations to be compared to each other, and may allow for different translators that have translated different source documents to be compared to each other.

Another option for evaluating the quality of the translation involves evaluating user engagement with the translation at step 78. For example, once the translation is provided to the requestor, the requestor may post the translation on a social network. At that point, different users may engage with the translation in various ways (e.g., liking the post including the translation, sharing the translation, or commenting on the translation). These engagements may be measured and potentially compared to an expected engagement amount, or the engagement that other similar documents have received in the past. Examples of measuring and evaluating user engagement of a translation are described in detail in U.S. patent application Ser. No. 15/192,109, entitled "Optimizing Machine Translations for User Engagement" and filed on Jun. 24, 2016.

Another option for evaluating the quality of the translation involves receiving a rating of the translation from the original requestor or author 80. Because the original requestor will likely be using the translation in a public manner, the original requestor is likely to receive feedback on the translation, and can report the feedback in the form of a rating back to the system.

Optionally, the quality of the translation as identified in step 68 may be communicated to the requestor when the translation is provided to the requestor (assuming that the quality is identified before the translation is provided to the requestor).

Once the quality of the transmission is evaluated at step 68, the quality may be used to modify the user's translation reputation 44 at step 82. For example, if the translation quality was above a predetermined threshold (indicating an adequate or better translation), the translation reputation 44 may be increased. On the other hand, if the translation quality was below the predetermined threshold (indicating a relatively low-quality translation), the translation reputation 44 may be decreased. Depending on how far away from the threshold the score was, the amount of the increase or decrease may be changed. For example, an exceptionally good translation may cause the translation reputation 44 to be increased substantially, whereas an acceptable but mediocre translation may cause the translation reputation 44 to be increased by a small amount, or to remain static. Optionally, the threshold may be dependent upon the user's current translation reputation 44, such that a user with an already-excellent reputation has a higher threshold than a user with a lower reputation.

The user may be provided with feedback on the quality of their translations through the quality scoring performed at step 68 and/or via the user's translation reputation 44.

Network Embodiments

Figure 6:
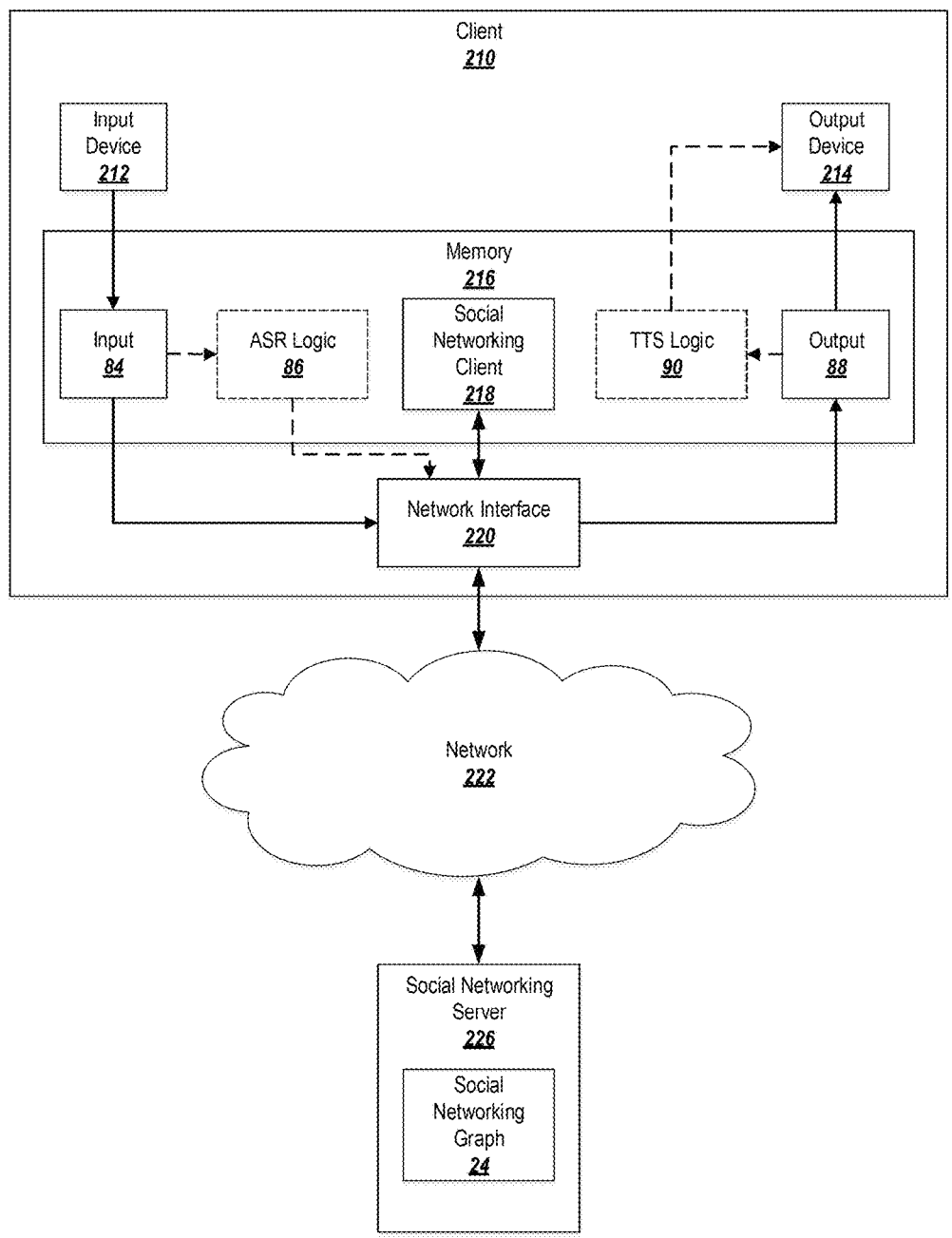
FIG. 6 depicts an exemplary network embodiment.

Some exemplary embodiments may be employed in a network environment, such as the environment depicted in FIG. 6.

A user may interact with a client 210, which may be (for example) a personal computer, tablet, mobile phone, special-purpose translation device, etc. In some embodiments, the client 210 does not require interaction from a user.

The client 210 may include one or more input devices 212 and one or more output devices 214. The input devices 212 may include, for example, microphones, keyboards, cameras, electronic pens, touch screens, and other devices for receiving an input in a source language $L_a$. The output devices 214 may include a speaker, a display device such as a monitor or touch screen, and other devices for presenting an output in a destination language $L_b$.

In some embodiments, the input from the input devices 212 may be in the form of an input 84 that is being sent to a social network for translation.

The client 210 may include a memory 216, which may be a non-transitory computer readable storage medium, such as one or a combination of a hard drive, solid state drive, flash storage, read only memory, or random access memory. The memory 216 may be a representation of an input 84 and/or a representation of an output 88, as well as one or more applications. For example, the memory 216 may store a social networking client 218 that allows a user to interact with a social networking service.

The input 84 may be textual, such as in the case where the input device 212 is a keyboard. Alternatively, the input 84 may be an audio recording, such as in the case where the input device 212 is a microphone. Accordingly, the input 84 may be subjected to automatic speech recognition (ASR) logic 86 in order to transform the audio recording to text. As shown in FIG. 6, the ASR logic 86 may be located at the client device 210 (so that the audio recording is processed locally by the client 210 and corresponding text is transmitted to the translation server 224). Alternatively, the ASR logic 86 may be located remotely at the social networking server 226 (in which case, the audio recording may be transmitted to the social networking server 226 and the social networking server 226 may process the audio into text). Other combinations are also possible—for example, if the input device 212 is a touch pad or electronic pen, the input 36 may be in the form of handwriting, which may be subjected to handwriting or optical character recognition analysis logic in order to transform the input 36 into processable text.

Similarly, a resulting output 88 may be in the form of text. In some embodiments, the desirable end form of the output may be something other than text, such as an audio representation of the translation. Accordingly, the output 88 may be subjected to text-to-speech (TTS) logic 90 in order to transform the text into an audio recording that is presentable by the output devices 214. As shown in FIG. 6, the TTS logic 90 may be located at the client device 210 (so that the output text is processed locally by the client 210 and corresponding audio is sent to the output devices 214), or may be located remotely at the social networking server 226 (in which case, text may be processed at the social networking server 226 and the resulting audio recording may be transmitted to the client 210). Other combinations of processing logic are also possible, depending on the desired final form for the output 88.

The client 210 may be provided with a network interface 220 for communicating with a network 222, such as the Internet. The network interface 220 may transmit the input 84 in a format and/or using a protocol compatible with the network 222 and may receive a corresponding output 88 from the network 222.

The network interface 220 of the client 210 may be used to communicate through the network 222 with a social networking server 226. The social networking server 226 may include or may interact with a social networking graph 24 that defines connections in a social network. Furthermore, the translation server 224 may connect to the social networking server 226 for various purposes, such as retrieving training data from the social network.

A user of the client 210 may be an individual (human user), an entity (e.g., an enterprise, business, or third-party application), or a group (e.g., of individuals or entities) that interacts or communicates with or over the social-networking server 226. The social-networking server 226 may be a network-addressable computing system hosting an online social network. The social-networking server 226 may generate, store, receive, and send social-networking data, such as, for example, user-profile data, concept-profile data, social-graph information, or other suitable data related to the online social network. The social-networking server 226 may be accessed by the other components of the network environment either directly or via the network 222.

The social-networking server 226 may include an authorization server (or other suitable component(s)) that allows users to opt in to or opt out of having their actions logged by social-networking server 226 or shared with other systems (e.g., third-party systems, such as the translation server 224), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking server 226 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 100 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social-networking system 226 may send a request to the data store for the object. The request may identify the user associated with the request. The requested data object may only be sent to the user (or a client system 210 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network that may benefit from the above-described translation system. Targeting criteria used to identify and target users may include explicit, stated user interests on social-networking server 226 or explicit connections of a user to a node, object, entity, brand, or page on social-networking server 226. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

Figure 7:
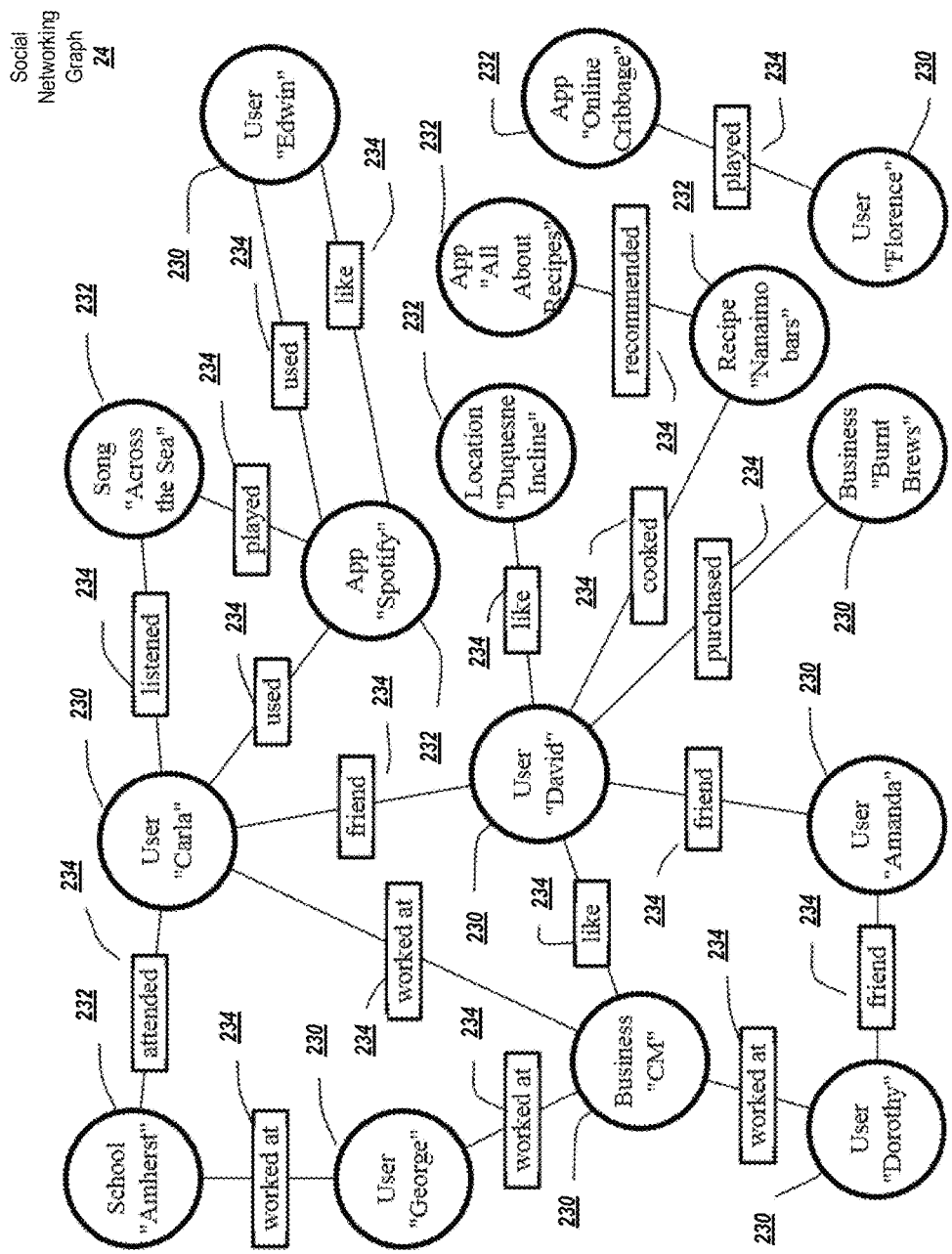
FIG. 7 describes the social networking graph depicted in FIG. 6 in more detail.

FIG. 7 illustrates an example of a social graph 24. In exemplary embodiments, a social-networking service may store one or more social graphs 24 in one or more data stores as a social graph data structure via the social networking service.

The social graph 24 may include multiple nodes, such as user nodes 230 and concept nodes 232. The social graph 24 may furthermore include edges 234 connecting the nodes. The nodes and edges of social graph 24 may be stored as data objects, for example, in a data store (such as a social-graph database). Such a data store may include one or more searchable or queryable indexes of nodes or edges of social graph 24.

The social graph 24 may be accessed by a social-networking server 226, client system 210, third-party system (e.g., the translation server 224), or any other approved system or device for suitable applications.

A user node 230 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 230 corresponding to the user, and store the user node 30 in one or more data stores. Users and user nodes 230 described herein may, where appropriate, refer to registered users and user nodes 230 associated with registered users. In addition or as an alternative, users and user nodes 230 described herein may, where appropriate, refer to users that have not registered with the social-networking system. In particular embodiments, a user node 230 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 230 may be associated with one or more data objects corresponding to information associated with a user. In particular embodiments, a user node 230 may correspond to one or more webpages. A user node 230 may be associated with a unique user identifier for the user in the social-networking system.

In particular embodiments, a concept node 232 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 232 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 232 may be associated with one or more data objects corresponding to information associated with concept node 232. In particular embodiments, a concept node 232 may correspond to one or more webpages.

In particular embodiments, a node in social graph 24 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 232. Profile pages may be viewable by all or a selected subset of other users. As an example and not by way of limitation, a user node 230 may have a corresponding user-profile page in which the corresponding user may add content, make declarations, or otherwise express himself or herself. A business page such as business page 205 may comprise a user-profile page for a commerce entity. As another example and not by way of limitation, a concept node 232 may have a corresponding concept-profile page in which one or more users may add content, make declarations, or express themselves, particularly in relation to the concept corresponding to concept node 232.

In particular embodiments, a concept node 232 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 230 corresponding to the user and a concept node 232 corresponding to the third-party webpage or resource and store edge 234 in one or more data stores.

In particular embodiments, a pair of nodes in social graph 24 may be connected to each other by one or more edges 234. An edge 234 connecting a pair of nodes may represent a relationship between the pair of nodes. In particular embodiments, an edge 234 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 234 connecting the first user's user node 230 to the second user's user node 230 in social graph 24 and store edge 234 as social-graph information in one or more data stores. In the example of FIG. 7, social graph 24 includes an edge 234 indicating a friend relation between user nodes 230 of user "Amanda" and user "Dorothy." Although this disclosure describes or illustrates particular edges 234 with particular attributes connecting particular user nodes 230, this disclosure contemplates any suitable edges 234 with any suitable attributes connecting user nodes 230. As an example and not by way of limitation, an edge 234 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 24 by one or more edges 234.

In particular embodiments, an edge 234 between a user node 230 and a concept node 232 may represent a particular action or activity performed by a user associated with user node 230 toward a concept associated with a concept node 232. As an example and not by way of limitation, as illustrated in FIG. 7, a user may "like," "attended," "played," "listened," "cooked," "worked at," or "watched" a concept, each of which may correspond to a edge type or subtype. A concept-profile page corresponding to a concept node 232 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 234 and a "used" edge (as illustrated in FIG. 7) between user nodes 230 corresponding to the user and concept nodes 232 corresponding to the song and application to indicate that the user listened to the song and used the application. Moreover, the social-networking system may create a "played" edge 234 (as illustrated in FIG. 7) between concept nodes 232 corresponding to the song and the application to indicate that the particular song was played by the particular application. In this case, "played" edge 234 corresponds to an action performed by an external application (SPOTIFY) on an external audio file (the song "Across the Sea"). Although this disclosure describes particular edges 234 with particular attributes connecting user nodes 230 and concept nodes 232, this disclosure contemplates any suitable edges 234 with any suitable attributes connecting user nodes 230 and concept nodes 232. Moreover, although this disclosure describes edges between a user node 230 and a concept node 232 representing a single relationship, this disclosure contemplates edges between a user node 230 and a concept node 232 representing one or more relationships. As an example and not by way of limitation, an edge 234 may represent both that a user likes and has used at a particular concept. Alternatively, another edge 234 may represent each type of relationship (or multiples of a single relationship) between a user node 230 and a concept node 232 (as illustrated in FIG. 7 between user node 230 for user "Edwin" and concept node 232 for "SPOTIFY").

In particular embodiments, the social-networking system may create an edge 234 between a user node 230 and a concept node 232 in social graph 24. As an example and not by way of limitation, a user viewing a concept-profile page (such as, for example, by using a web browser or a special-purpose application hosted by the user's client system) may indicate that he or she likes the concept represented by the concept node 232 by clicking or selecting a "Like" icon, which may cause the user's client system to send to the social-networking system a message indicating the user's liking of the concept associated with the concept-profile page. In response to the message, the social-networking system may create an edge 234 between user node 230 associated with the user and concept node 232, as illustrated by "like" edge 234 between the user and concept node 232. In particular embodiments, the social-networking system may store an edge 234 in one or more data stores. In particular embodiments, an edge 234 may be automatically formed by the social-networking system in response to a particular user action. As an example and not by way of limitation, if a first user uploads a picture, watches a movie, or listens to a song, an edge 234 may be formed between user node 230 corresponding to the first user and concept nodes 232 corresponding to those concepts. Although this disclosure describes forming particular edges 234 in particular manners, this disclosure contemplates forming any suitable edges 234 in any suitable manner.

The social graph 24 may further comprise a plurality of product nodes. Product nodes may represent particular products that may be associated with a particular business. A business may provide a product catalog to a consumer-to-business service and the consumer-to-business service may therefore represent each of the products within the product in the social graph 24 with each product being in a distinct product node. A product node may comprise information relating to the product, such as pricing information, descriptive information, manufacturer information, availability information, and other relevant information. For example, each of the items on a menu for a restaurant may be represented within the social graph 24 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 24. The information for a product node may be manipulated by the social-networking system as a product object that encapsulates information regarding the referenced product.

As such, the social graph 24 may be used to infer shared interests, shared experiences, or other shared or common attributes of two or more users of a social-networking system. For instance, two or more users each having an edge to a common business, product, media item, institution, or other entity represented in the social graph 24 may indicate a shared relationship with that entity, which may be used to suggest customization of a use of a social-networking system, including a messaging system, for one or more users.

Computer-Related Embodiments

Figure 8:
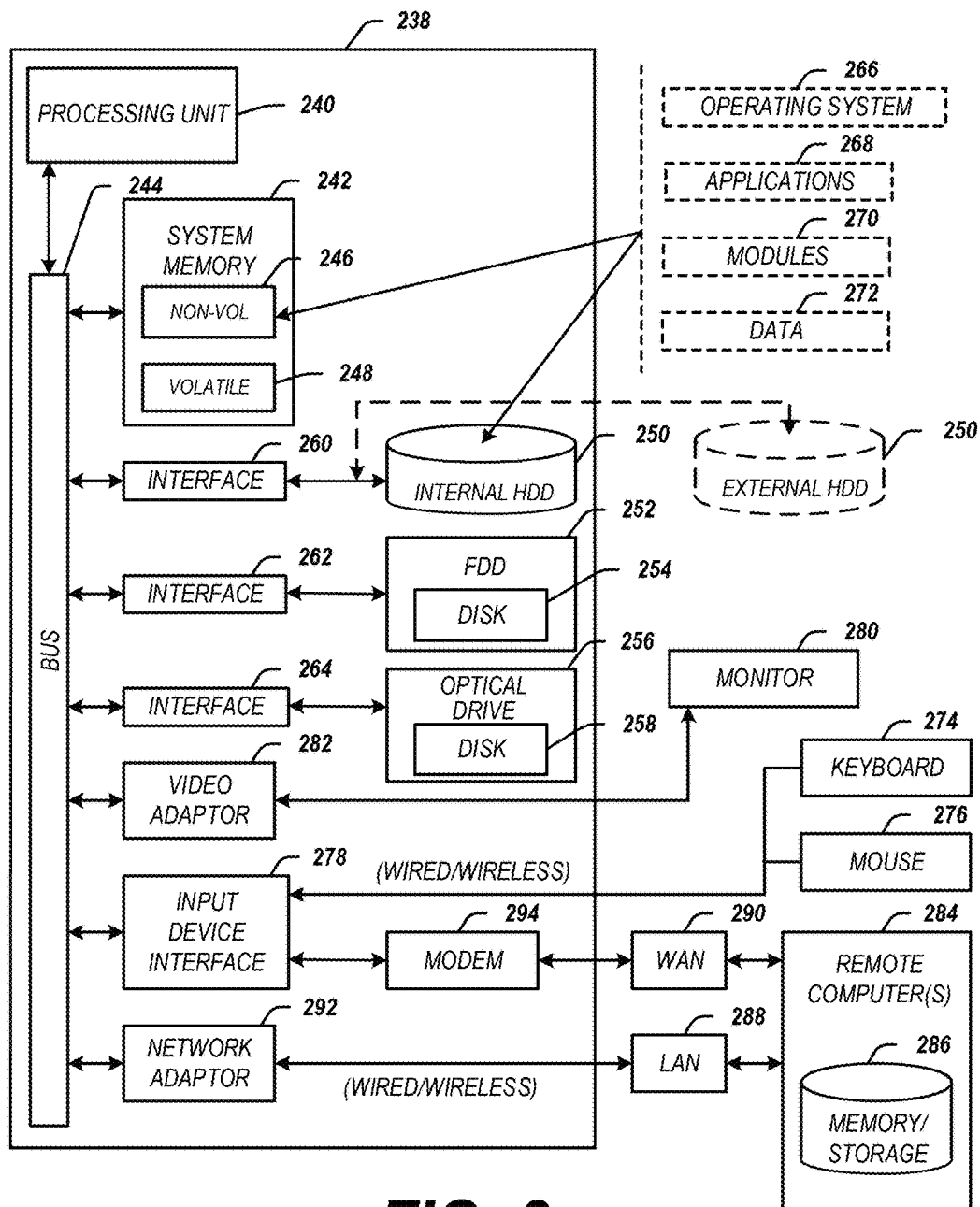
FIG. 8 depicts an exemplary computing device suitable for use with exemplary embodiments.

The above-described methods may be embodied as instructions on a computer readable medium or as part of a computing architecture. FIG. 8 illustrates an embodiment of an exemplary computing architecture 236 suitable for implementing various embodiments as previously described. In one embodiment, the computing architecture 236 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 236. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 236 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 236.

As shown in FIG. 8, the computing architecture 236 comprises a processing unit 240, a system memory 242 and a system bus 244. The processing unit 240 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 240.

The system bus 244 provides an interface for system components including, but not limited to, the system memory 242 to the processing unit 240. The system bus 244 can be any of several types of bus structure that may further interconnect to a memory bus (with or without a memory controller), a peripheral bus, and a local bus using any of a variety of commercially available bus architectures. Interface adapters may connect to the system bus 244 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 236 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 242 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 242 can include non-volatile memory 246 and/or volatile memory 248. A basic input/output system (BIOS) can be stored in the non-volatile memory 246.

The computer 238 may include various types of computer-readable storage media in the form of one or more lower speed memory units, including an internal (or external) hard disk drive (HDD) 250, a magnetic floppy disk drive (FDD) 252 to read from or write to a removable magnetic disk 254, and an optical disk drive 256 to read from or write to a removable optical disk 258 (e.g., a CD-ROM or DVD). The HDD 250, FDD 252 and optical disk drive 256 can be connected to the system bus 244 by a HDD interface 260, an FDD interface 262 and an optical drive interface 264, respectively. The HDD interface 260 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 246, 248, including an operating system 266, one or more application programs 268, other program modules 270, and program data 272. In one embodiment, the one or more application programs 268, other program modules 270, and program data 272 can include, for example, the various applications and/or components of the system 30.

A user can enter commands and information into the computer 238 through one or more wire/wireless input devices, for example, a keyboard 274 and a pointing device, such as a mouse 276. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 504 through an input device interface 278 that is coupled to the system bus 244, but can be connected by other interfaces such as a parallel port, IEEE 694 serial port, a game port, a USB port, an IR interface, and so forth.

A monitor 280 or other type of display device is also connected to the system bus 244 via an interface, such as a video adaptor 282. The monitor 280 may be internal or external to the computer 238. In addition to the monitor 280, a computer typically includes other peripheral output devices, such as speakers, printers, and so forth.

The computer 238 may operate in a networked environment using logical connections via wire and/or wireless communications to one or more remote computers, such as a remote computer 284. The remote computer 284 can be a workstation, a server computer, a router, a personal computer, portable computer, microprocessor-based entertainment appliance, a peer device or other common network node, and typically includes many or all of the elements described relative to the computer 238, although, for purposes of brevity, only a memory/storage device 286 is illustrated. The logical connections depicted include wire/wireless connectivity to a local area network (LAN) 288 and/or larger networks, for example, a wide area network (WAN) 290. Such LAN and WAN networking environments are commonplace in offices and companies, and facilitate enterprise-wide computer networks, such as intranets, all of which may connect to a global communications network, for example, the Internet.

When used in a LAN networking environment, the computer 238 is connected to the LAN 288 through a wire and/or wireless communication network interface or adaptor 292. The adaptor 292 can facilitate wire and/or wireless communications to the LAN 288, which may also include a wireless access point disposed thereon for communicating with the wireless functionality of the adaptor 292.

When used in a WAN networking environment, the computer 238 can include a modem 294, or is connected to a communications server on the WAN 290, or has other means for establishing communications over the WAN 290, such as by way of the Internet. The modem 294, which can be internal or external and a wire and/or wireless device, connects to the system bus 244 via the input device interface 278. In a networked environment, program modules depicted relative to the computer 238, or portions thereof, can be stored in the remote memory/storage device 286. It will be appreciated that the network connections shown are exemplary and other means of establishing a communications link between the computers can be used.

The computer 238 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method comprising:
   receiving a request to translate a source document from a source language into a destination language, the source document associated with an originating entity and one or more topics;
   retrieving a list of translators proficient in the source language and the destination language;
   computing scores for the translators in the list, the scores representing at least one of the translators' level of interest in the one or more topics of the source document, or the translators' level of engagement with the originating entity that originated the source document, wherein, of the list of translators, a score of a translator is further computed based on one or more criteria selected from a group consisting of:
      affinity of the translator for a requestor of the translation;
      affinity of the translator for the originating entity;
      demographic information of the translator;
      information derived from the demographic information of the translator;
      connections, on a social graph, between the translator and the requestor; and
      connections, on the social graph, between the translator and the originating entity;
   categorizing the translators into groups or ranks based on the computed scores;
      selecting a candidate group of translators based at least in part on the categorized groups or ranks;
   receiving a selection of one or more translators in the candidate group; and
   sending a request to translate the source document to the selected one or more translators.

2. The method of claim 1, further comprising:
   analyzing at least one of the source document or the originating entity to identify the one or more topics associated with the source document or the originating entity.

3. The method of claim 1, further comprising:
   transmitting the levels of interest to an originator of the request;
   receiving the selection of the one or more translators for the originator; and
   providing a connection between the originator and the selected translators.

4. The method of claim 1, further comprising:
   receiving a translated document from one of the selected translators;
   evaluating a quality of the translated document; and
   adjusting a reputation score of the one of the selected translators based on the quality of the translated document.

5. The method of claim 4, further comprising providing the reputation score to an originator of the request.

6. The method of claim 4, wherein evaluating the quality of the translated document comprises:
   translating the translated document back into the source language to create a retranslated document; and
   comparing the retranslated document to the source document.

7. The method of claim 4, wherein evaluating the quality of the translated document comprises measuring a level of user engagement with the translated document.

8. A non-transitory computer-readable medium storing instructions that, when executed by one or more processors, cause the one or more processors to:
   receive a request to translate a source document from a source language into a destination language, the source document associated with an originating entity and one or more topics;
   retrieve a list of translators proficient in the source language and the destination language;
   compute scores for the translators in the list, the scores representing at least one of the translators' level of interest in the one or more topics of the source document, or the translators' level of engagement with the originating entity that originated the source document, wherein, of the list of translators, a score of a translator is further computed based on one or more criteria selected from a group consisting of:
      affinity of the translator for a requestor of the translation;
      affinity of the translator for the originating entity;
      demographic information of the translator;
      information derived from the demographic information of the translator;
      connections, on a social graph, between the translator and the requestor; and
      connections, on the social graph, between the translator and the originating entity;
   categorize the translators into groups or ranks based on the computed scores;
      select a candidate group of translators based at least in part on the categorized groups or ranks;
   receive a selection of one or more translators in the candidate group; and
   send a request to translate the source document to the selected one or more translators.

9. The medium of claim 8, further storing instructions for:
analyzing at least one of the source document or the originating entity to identify the one or more topics associated with the source document or the originating entity.

10. The medium of claim 8, further storing instructions for:
transmitting the levels of interest to an originator of the request;
receiving the selection of the one or more translators for the originator; and
providing a connection between the originator and the selected translators.

11. The medium of claim 8, further storing instructions for:
receiving a translated document from one of the selected translators;
evaluating a quality of the translated document; and
adjusting a reputation score of the one of the selected translators based on the quality of the translated document.

12. The medium of claim 11, further storing instructions for providing the reputation score to an originator of the request.

13. The medium of claim 11, wherein evaluating the quality of the translated document comprises:
translating the translated document back into the source language to create a retranslated document; and
comparing the retranslated document to the source document.

14. The medium of claim 11, wherein evaluating the quality of the translated document comprises measuring a level of user engagement with the translated document.

15. An apparatus comprising:
a non-transitory computer-readable medium configured to store a list of translators proficient in a source language and a destination language; and
logic, at least a portion of which is implemented in hardware, the logic configured to:
receive a request to translate a source document from a source language into a destination language, the source document associated with an originating entity and one or more topics;
compute scores for the translators in the list, the scores representing at least one of the translators' level of interest in the one or more topics of the source document, or the translators' level of engagement with the originating entity that originated the source document, wherein, of the list of translators, a score of a translator is further computed based on one or more criteria selected from a group consisting of:
affinity of the translator for a requestor of the translation;
affinity of the translator for the originating entity;
demographic information of the translator;
information derived from the demographic information of the translator;
connections, on a social graph, between the translator and the requestor; and
connections, on the social graph, between the translator and the originating entity;
categorize the translators into groups or ranks based on the computed scores;
select a candidate group of translators based at least in part on the categorized groups or ranks;
receive a selection of one or more translators in the candidate group; and
send a request to translate the source document to the selected one or more translators.

16. The apparatus of claim 15, wherein the logic is further configured to analyze at least one of the source document or the originating entity to identify the one or more topics associated with the source document or the originating entity.

17. The apparatus of claim 15, wherein the logic is further configured to:
transmit the levels of interest to an originator of the request;
receive the selection of the one or more translators for the originator; and
provide a connection between the originator and the selected translators.

18. The apparatus of claim 15, wherein the logic is further configured to:
receive a translated document from one of the selected translators;
evaluate a quality of the translated document; and
adjust a reputation score of the one of the selected translators based on the quality of the translated document; and
provide the reputation score to an originator of the request.

19. The apparatus of claim 18, wherein the logic is further configured to:
translate the translated document back into the source language to create a retranslated document; and
compare the retranslated document to the source document.

20. The apparatus of claim 18, wherein the logic is further configured to measure a level of user engagement with the translated document.

* * * * *